UNITED STATES PATENT OFFICE.

HENRIK GAHN, OF UPSALA, SWEDEN.

IMPROVEMENT IN MEDICAL COMPOUNDS.

Specification forming part of Letters Patent No. 137,542, dated April 8, 1873; application filed February 1, 1873.

*To all whom it may concern:*

Be it known that I, HENRIK GAHN, of Upsala, Sweden, have invented a certain Compound called "Amykos," to be used as a chemical preparation for the cure of internal complaints caused by "parasitical infusories;" for purifying the blood, and for a mouth-wash to heal the gums and cleanse the breath.

The amykos is a chemical preparation, divided into or to be used as single amykos and concentrated amykos.

The nature and preparation of amykos are as follows: To prepare the single amykos a decoction is made by boiling, for about two hours, one gallon of water mixed with from one-half ounce to five ounces of cloves, and from one-half ounce to twelve ounces of pure glycerine; the proportion of cloves and glycerine usually adopted being one ounce of the former and five ounces of the latter. While this decoction is still boiling add, say, five ounces of borax and two ounces of soda, and also pour in a small quantity—say, one-half ounce—of a mixture of the oils of peppermint, portulacca, and gerania. This oil I term "atheroleum;" and it is composed of—oil of peppermint, ten parts; oil of portulacca, five parts; oil of geranium, two parts. The boiling is continued for some time, and the mixture well stirred. It is then left to stand a while to cool, after which the fluid is drawn off from the bottom of the vessel, leaving the atheroleum, which floats on top, behind. It should be filtered till it is perfectly clear before bottling the amykos.

"Concentrated amykos" is prepared by using much greater quantities of cloves, glycerine, borax, and soda to a gallon of water; and in its preparation no atheroleum is employed.

This will prove to be a radical cure for all internal complaints derived from the influence of parasitical infusories, as it will effectually kill and destroy such infusories. It will also prove to be an excellent mouth-wash, as it takes away bad breath, prevents the gums from bleeding and swelling, &c.

I broadly disclaim everything described in the patent granted to me January 25, 1870.

Claim.

I claim as my invention—

A compound called amykos, composed of a decoction of glycerine, cloves, borax, and soda, substantially in the proportions specified.

Dated Stockholm, Sweden, April 15, 1872.

HENR. GAHN.

Witnesses:
   C. A. LOWENHIELM,
   T. A. G. TORNEMAN.